Dec. 6, 1960 W. A. HOLMAN 2,963,690
MAGNETIC TRANSDUCER
Filed Oct. 14, 1957

INVENTOR.
WESLEY A HOLMAN
BY John B. Clark
ATTORNEY

United States Patent Office 2,963,690

Patented Dec. 6, 1960

2,963,690

MAGNETIC TRANSDUCER

Wesley A. Holman, San Jose, Calif., assignor to International Business Machines Corporation, New York, N.Y., a corporation of New York

Filed Oct. 14, 1957, Ser. No. 690,020

1 Claim. (Cl. 340—174.1)

Figure 1:
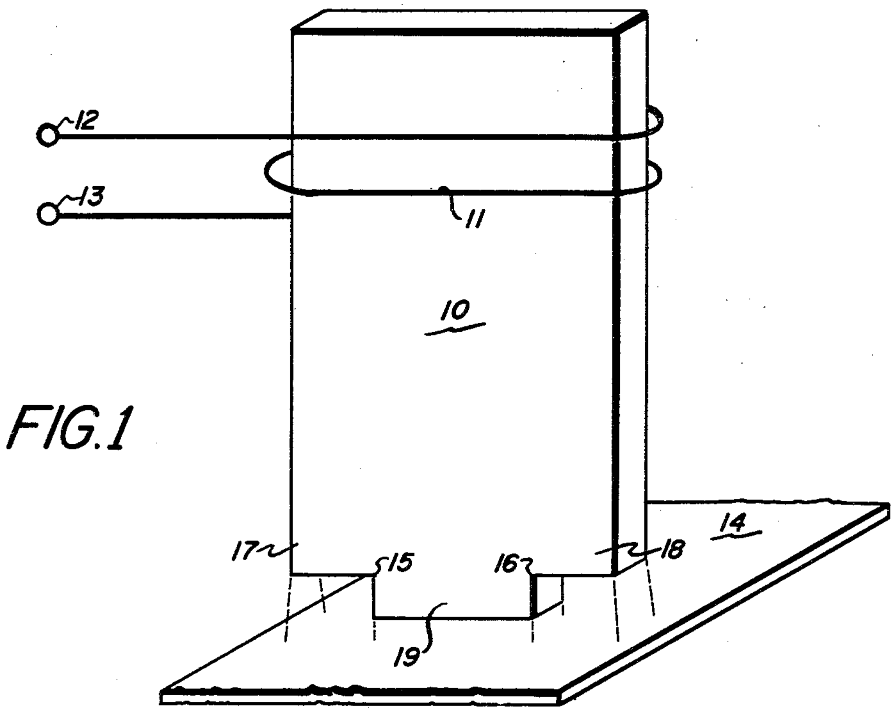

The present invention relates generally to magnetic transducers and pertains more particularly to a "wide-write, narrow-read" magnetic transducer.

In magnetic data storage devices such as shown in the co-pending application, Serial No. 477,468, filed December 24, 1954, in the names of Louis D. Stevens, et al., where a transducer is positionable for cooperating with selected tracks of a magnetic record member, problems have arisen when the transducer is repositioned for reading previously recorded data. Unless the transducer is repositioned to the same location (within a given tolerance) transversely of the track as it was when the data was recorded, errors in the detection of the coded signals may result. For this reason, transducers have been provided for writing along a wider strip of track than is scanned by the transducer for reading purposes. One such transducer adapted to longitudinal magnetic recordings is shown in the co-pending application, Serial No. 532,488, filed September 6, 1955, now abandoned, in the name of Wesley A. Holman, wherein the write gap provided in the core of the transducer is wider than the corresponding read gap. This reduces the positioning tolerance required for eliminating errors brought about by the inaccuracies in the positioning mechanism.

The present invention is directed to a wide-write, narrow-read transducer adapted for vertical magnetic recording and includes a probe, portions of the width of which are substantially ineffective for reading purposes, the entire width being utilized for recording purposes. Thus, when the transducer is positioned for recording on a selected track of a record member, the width of the signals recorded on the record corresponds to the full width of the probe. For reading purposes, however, a lesser width of the probe is utilized and only a portion of the recorded track is sensed thereby.

An object of the invention is to provide an improved wide-write, narrow-read magnetic transducer.

Another object is to provide a wide-write, narrow-read probe type magnetic transducer.

A further object is to provide a probe type magnetic transducer, portions of which are substantially ineffective on reading operations.

Still another object is to provide a magnetic transducer including a probe, the full width of which is rendered operative for recording purposes, but being arranged to utilize only a portion of the width for reading purposes.

Other objects of the invention will be pointed out in the following description and claim and illustrated in the accompanying drawings which disclose, by way of example, the principle of the invention and the best mode which has been contemplated of applying that principle.

In the drawings:

Fig. 1 discloses a perspective view of one embodiment of the invention.

Figure 2:
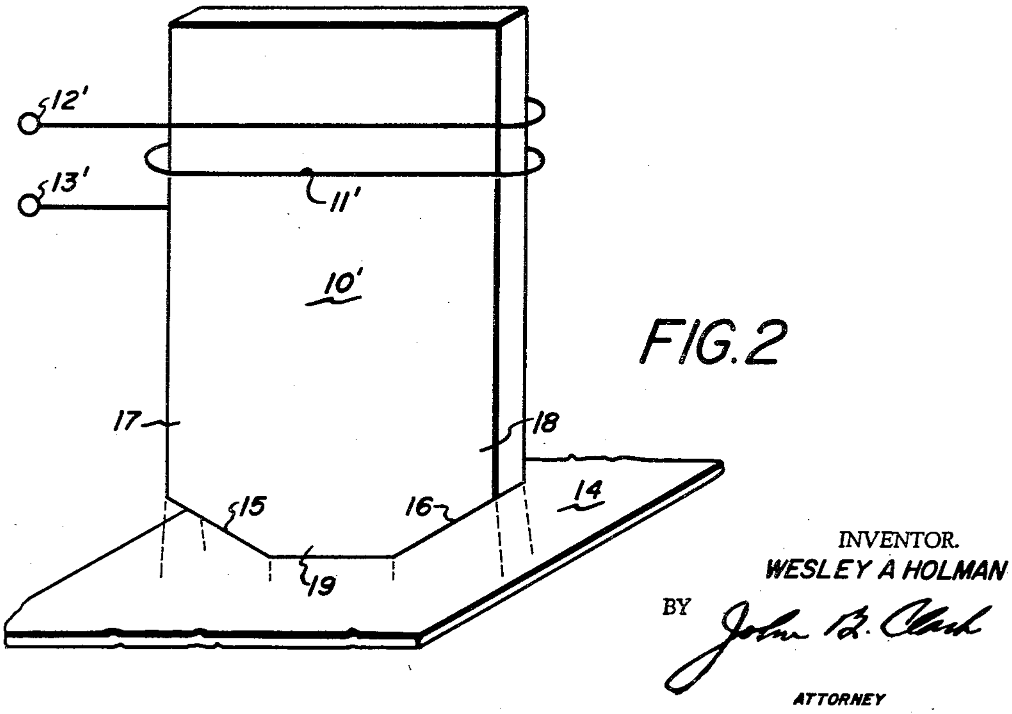

Fig. 2 discloses a perspective view of a second embodiment of the invention.

According to the invention, a probe is provided which has a configuration such that only a first portion of the width thereof is useful for reading purposes. Second portions disposed on either or both sides of the first portion are spaced farther from the record member than the first portion so that the reluctance of the magnetic path from the record to the first portion of the transducer is much less than the reluctance from the record to the second portions. Thus, for all practical purposes the width of the probe for reading is defined by the width of the first portion. When writing, means are provided for saturating the entire probe width according to the write signal, whereby the magnetic lines of force emanate from the full width of the probe for effecting a wide recording on the record member.

Referring now to Fig. 1, the transducer of the invention comprises a probe 10 linked by a read-record winding 11 connected to terminals 12 and 13. The probe 10 is shown as disposed adjacent a magnetic record member 14 for cooperating therewith in a well known manner. The end of the probe 10 opposed to the record 14 is notched on either side thereof, as at 15 and 16, for increasing the reluctance between the record and those portions 17 and 18 of the probe disposed above the notches. In this manner, the reluctance between the central portion 19 of the probe and the record is rendered substantially less than the reluctance between the portions 17 and 18 and the record.

When writing on the record, a suitable write signal is connected across terminals 12 and 13, this signal being sufficient to saturate the probe 10. Under these conditions the magnetic lines of force emanate from the full probe width, including all three portions 17, 18 and 19, for effecting a recording on the record which corresponds in width to the full probe width.

As mentioned above, the reluctance between a record and the portions 17 and 18 of the probe is substantially larger than the reluctance between the record and the portion 19. Thus, during a reading operation, the terminals 12 and 13 being connected to a suitable read amplifier at this time, substantially all of the lines of force emanating from the magnetized record and entering the probe do so through the portion 19 thereof for inducing a read signal in the winding 11. The magnetic lines of force entering the probe through the portions 17 and 18 have little effect on the signal induced in the winding due to the much higher reluctance between these portions and the record as compared to the reluctance between the portion 19 and the record, and it will be understood, therefore, that the signal taken from the terminals 12 and 13 corresponds to that portion of the width of the record associated with the portion 19 of the probe. In brief, therefore, the probe 10 is saturated when it is desired to record and the record is magnetized according to the full width of the probe. When reading, only that portion of the recorded track opposed to the portion 19 of the probe is effective for inducing signals in the winding 11 and it will be understood, therefore, that the described transducer is effective to accomplish the wide-write, narrow-read function desired.

The embodiment of the invention shown in Fig. 2 is similar to that shown in Fig. 1, the only difference being that the edge portions of the probe 10' shown in Fig. 2 are tapered as at 15' and 16' instead of being notched as was the case in the embodiment shown in Fig. 1. The operation of the device shown in Fig. 2 is similar, means being provided to drive the winding 11' sufficiently to saturate the probe when it is desired to record. This effects the recordation of a track corresponding to a full width of the probe as described above. When reading, the portions 17' and 18' are substantially ineffective, the read signal induced in the winding 11' resulting from the magnetic lines of force entering the portion 19' of the probe. Thus, the embodiment of the invention shown in Fig. 2 effects the wide-write, narrow-read mode of operation as is desired.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A write-wide, read-narrow magnetic transducer for cooperating with a magnetic record track comprising a probe including first and second portions, each of a given area, disposed adjacent each other laterally of said track defining the recording width of said probe, said first portion being arranged closer to said record track than said second portion to provide a high reluctance path from said record to said second portion of said head and a relatively lower reluctance path from said record to said first portion of said head, a winding in common magnetic flux relationship with said first and second portions, said winding being connectable to a write signal across said winding and being of sufficient amplitude to saturate said first and second portions of said probe for causing magnetic lines of force to emanate from the full recording width of the probe for magnetizing the record tract according to said write signal, said probe being operable to perform a read function whereby substantially all signals induced in said winding on read operations result from magnetic lines of force entering said first portion from said record and on write operations a track corresponding in width to said first and second portions of said probe is recorded on said record.

References Cited in the file of this patent

UNITED STATES PATENTS

| | | |
|---|---|---|
| 2,092,024 | Rowe | Sept. 7, 1937 |
| 2,547,464 | Hehr | Apr. 3, 1951 |
| 2,843,676 | Halliday | July 15, 1958 |
| 2,844,665 | Mann | July 22, 1958 |